(12) United States Patent
Wakashiro et al.

(10) Patent No.: US 6,408,968 B1
(45) Date of Patent: Jun. 25, 2002

(54) CONTROL SYSTEM FOR HYBRID VEHICLE

(75) Inventors: Teruo Wakashiro; Atsushi Matsubara; Shinichi Kitajima; Kan Nakaune; Morio Kayano; Kazunori Watanabe, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/638,071

(22) Filed: Aug. 15, 2000

(30) Foreign Application Priority Data

Aug. 17, 1999 (JP) .......................................... 11-230914

(51) Int. Cl.$^7$ ................................................. B60K 6/00
(52) U.S. Cl. ...................... 180/65.3; 180/65.2; 701/22
(58) Field of Search ............................... 180/65.1–65.4, 180/65.8; 701/22, 99

(56) References Cited

U.S. PATENT DOCUMENTS

| | | | | |
|---|---|---|---|---|
| 5,566,774 A | * | 10/1996 | Yoshida | 180/65.4 |
| 6,018,694 A | * | 1/2000 | Egami et al. | 701/102 |
| 6,019,183 A | * | 2/2000 | Shimasaki et al. | 180/165 |
| 6,158,537 A | * | 12/2000 | Nonobe | 180/65.3 |
| 6,202,782 B1 | * | 3/2001 | Hatanaka | 180/301 |
| 6,234,932 B1 | * | 5/2001 | Kuroda et al. | 477/3 |
| 6,278,915 B1 | * | 8/2001 | Deguchi et al. | 701/22 |

FOREIGN PATENT DOCUMENTS

| | | |
|---|---|---|
| JP | 7-123509 | 5/1995 |
| JP | 11-89008 | 3/1999 |

* cited by examiner

Primary Examiner—J. J. Swann
Assistant Examiner—L. Lum
(74) Attorney, Agent, or Firm—Armstrong, Westerman & Hattori, LLP

(57) ABSTRACT

In vehicle operation under cruise mode, the battery, which is in a low temperature state, is caused to rise in temperature at an early stage, and the assistance amount and the regeneration power generation amount by means of the motor are caused to increase. During vehicle operation in cruise mode, in the case in which one or the other of the battery temperature and the engine water temperature have failed to reach a predetermined temperature, the cruise power generation amount is raised to a predetermined level, and charging of the battery is continued until both the battery temperature and the engine water temperature have reached predetermined temperatures. When a determination has been made that there is no further room in the battery to accept further charge, power generation and assistance is conducted by the motor so as to cancel periodic fluctuations in the drive force of the engine, and vibration damping control is conducted for suppressing vibrations generated by the engine in accordance with the fluctuations in the drive force of the engine.

3 Claims, 13 Drawing Sheets

CONTROL SYSTEM FOR HYBRID VEHICLE

BACKGROUND OF THE INVENTION

1. Field of the Invention

The present invention relates to a control system for hybrid vehicles which are driven by engines as well as motors, and in particular relates to a hybrid vehicle control system which conducts the control of the heating of a battery during cruise operation.

This application is based on Japanese Patent Application No. Hei 11-230914, the contents of which are incorporated herein by reference.

2. Description of the Related Art

Conventionally, hybrid vehicles which are provided with motors in addition to engines as power sources for operating the vehicles are known.

One type of these hybrid vehicles are parallel hybrid vehicles, in which a motor is employed as an auxiliary power source for assisting the output of the engine. In these parallel hybrid vehicles, various types of control are conducted, such as the assistance of the output of the engine by the motor during acceleration, and the charging of the battery by deceleration regeneration during deceleration, and such vehicles are capable of satisfying the requirements of the driver while maintaining the remaining capacity (electrical energy) of the battery (such a vehicle is disclosed, for example, in Japanese Unexamined Patent Application, First Publication No. Hei. 7-123509).

However, in the conventional hybrid vehicle control system described above, from the point of view of an increase in the charge/discharge efficiency of the battery, and the protection of the battery, as shown in FIG. 15, prespecified upper limits (assist power save line ASSIST and regeneration power save line REGEN) are provided in the amount of assistance and the amount of regenerated power generation produced by the motor in accordance with the temperature of the battery, and these are set so that the acceptance width W of the assistance amount and the regenerated power generation amount decreases as the battery temperature TBAT is lowered. For this reason, when the battery temperature decreases, as after a long period of parking in a cold area, the assistance amount and the regenerated power generation amount are limited to low values.

Here, when acceleration and deceleration operation is conducted in which acceleration and deceleration are repeated, then assistance and the regeneration of power generation are repeatedly conducted by the motor within the range of acceptance width W of the assistance amount and the regenerated power generation amount in accordance with the temperature of the battery, and thereby, the flow of charge current and discharge current into and out of the battery is frequently conducted, Joule heat is generated as a result of the internal resistance of the battery, and the temperature of the battery rises at an early stage. However, when cruise operation is conducted, in which there is little charging or discharging of the battery, the battery is merely heated by the internal heater of the vehicle via a fan or the like, and the heating of the battery is delayed, and thereby, a problem is caused in that the assistance amount and the regenerated power generation amount of the motor are limited to low values.

SUMMARY OF THE INVENTION

The present invention was created in light of the above circumstances; it has as an object thereof to provide a hybrid vehicle control system which is capable, during vehicle operation in the cruise mode, of raising the temperature of a battery which is at a low temperature in a short period of time, and increasing the assistance amount and the regenerated power generation amount of the motor.

In order to attain the object of solving the problems described above, in a first aspect of the present invention, a hybrid vehicle control system which is provided with: an engine which outputs the propulsion force of the vehicle; a motor which assists the output of the engine in accordance with the operational state of the vehicle; and an electricity storage device, which stores generated energy, when the motor is employed as a generator by the output of the engine, and regenerated energy, which is produced by the regenerative state of the motor when the vehicle decelerates, comprising: an electricity storage device temperature detector (in the embodiment described hereinbelow, step S102 and step S107) for detecting the temperature of the electricity storage device; an engine water temperature detector (in the embodiment described hereinbelow, step S105) for detecting the engine water temperature which is related to the temperature of the engine; and a power generation increasing device (in the embodiment described hereinbelow, step S103 or step S106) for increasing the amount of generated energy when the motor is used as a generator during vehicle operation by the drive force of the engine, without the output assistance of the engine by the motor in accordance with the operational state of the vehicle, either in the case in which the electricity storage device temperature is detected at or below a predetermined electricity storage device temperature by the electricity storage device temperature detector, or in the case in which the engine water temperature is detected at or below a predetermined temperature by the engine water temperature, detector.

In accordance with the hybrid vehicle control system having the composition described above, during operation of the vehicle in cruise mode, the amount of energy generated by the motor is increased, and thereby, a charging current is supplied to the electricity storage device, and the electricity storage device heats itself by means of the Joule heat generated as a result of the internal resistance of the electricity storage device. By means of this, it is possible to raise the temperature of an electricity storage device which is at a low temperature at an early stage, and by raising the temperature of the electricity storage device, it is possible to increase, at an early stage, the amount of assistance and the amount of regenerated power generation of the motor.

Furthermore, in a second aspect of the present invention, the hybrid vehicle control system further comprising: a remaining capacity detector (in the embodiment described hereinbelow, battery ECU 13) for detecting remaining capacity of the electricity storage device, and an overcharge correcting device (in the embodiment described hereinbelow, step S201) for raising a power generation suppression threshold which serves to suppress generation of electricity by the motor in the case in which the remaining capacity is detected to be in an overcharged state by the remaining capacity detector when in the amount of energy generated by the motor is increased by the power generation increasing device, are provided.

In accordance with the hybrid vehicle control system having the composition described above, during normal control in which the temperature of the electricity storage device is sufficiently high, when a determination is made that the remaining capacity of the electricity storage device is in an overcharged state, then further power generation by the motor is suppressed and further charging of the electricity storage device is not conducted; however, when the electricity storage device is at a low temperature, the power generation suppression threshold which serves to suppress power generation by the motor is raised, and by continuously conducting charging of the electricity storage device, it is possible to increase the internal resistance of the electricity storage device and to generate a large amount of Joule heat, and it is possible to promote the self-heating of the electricity storage device. When the temperature of the electricity storage device is low, even if charging of the overcharged state electricity storage device is continued, it is possible to ignore the possibility of damage to the electricity storage device.

Furthermore, in a third aspect of the invention, the hybrid vehicle control system further comprising: a vibration suppressing controller (in the embodiment described hereinbelow, steps S501–S507) is provided for suppressing vibration of the engine resulting from fluctuations in the drive force of the engine by conducting power generation by the motor when the drive force is increasing and conducting output assistance of the engine by the motor when the drive force is decreasing so as to cancel periodic amounts of fluctuation in the drive force of the engine, in the case in which the remaining capacity is detected by the remaining capacity detector to be in excess of a predetermined remaining capacity threshold value, and a fully charged state is thus detected.

In accordance with the hybrid vehicle control system having the composition described above, when a determination is made that the remaining capacity of the electricity storage device is in a fully charged state, that is to say, that the state is such that further charging can not be accepted, by conducting vibration control which controls the motor so as to cancel the amount of fluctuation in the drive force of the engine, it is possible to leave the load on the engine, and it is possible to increase the engine water temperature. As a result of this, the temperature of the heater within the vehicle rises, and it is possible to increase the temperature of the electricity storage device via a fan or the like. There is no decrease in the load on the engine, so that the fuel consumption temporarily worsen, however, by promoting an increase in the temperature of the electricity storage device, the assistance amount and the regenerated power generation amount of the motor are increased at an early stage, so that it is possible to improve the fuel consumption in terms of the overall operation of the vehicle.

DETAILED DESCRIPTION OF THE PREFERRED EMBODIMENTS

Figure 1:
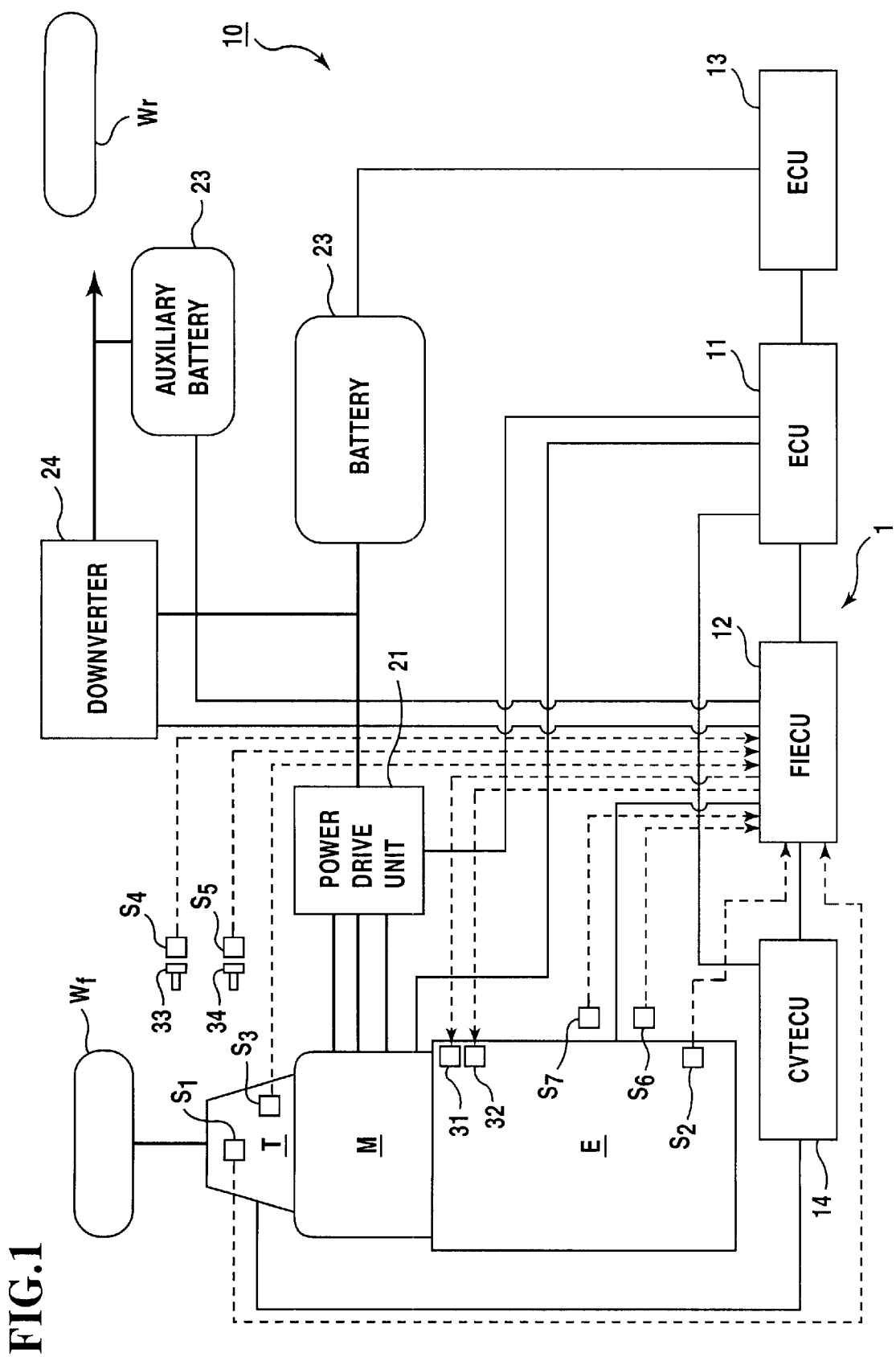
FIG. 1 is a structural diagram of a hybrid vehicle which is provided with a hybrid vehicle control system in accordance with an embodiment of the present invention.

Hereinbelow, an embodiment of the hybrid vehicle control system of the present invention will be explained with reference to the attached figures. FIG. 1 is a schematic diagram of a hybrid vehicle 10 which is provided with a hybrid vehicle control system 1 in accordance with the embodiment of the present invention.

This hybrid vehicle 10 is, for example, a parallel hybrid vehicle, and the drive force of both the engine E and the motor M are transmitted to the front wheels Wf, Wf which are the drive wheels, via a transmission T comprising an automatic transmission or a manual transmission. Furthermore, when drive force is transmitted from front wheels Wf, Wf to motor M during deceleration of the hybrid vehicle 10, motor M functions as a generator, and generates so-called regeneration braking force, and the kinetic energy of the vehicle is recovered as electrical energy.

The hybrid vehicle control system 1 of the present embodiment is provided with a motor ECU 11, FIECU 12, battery ECU 13, and CVTECU 14.

The drive and regenerative state of motor M are conducted by power drive unit 21 which receives control directives from motor ECU 11. A motor M and a high voltage system battery 22, which conducts the sending and receiving of electrical energy, are connected to the power drive unit 21, and battery 22 is one in which a plurality, for example, 10, of modules are connected in series; in these modules, a plurality, for example, 20, of cells are connected in series. A 12-volt auxiliary battery 23 which serves to drive various auxiliary devices is installed in hybrid vehicle 10, and this auxiliary battery 23 is connected to battery 22 via a downverter 24. The downverter 24, which is controlled by FIECU 12, lowers the voltage of battery 22 and charges auxiliary battery 23.

FIECU 12 conducts, in addition to the motor ECU 11 and the downverter 24, the operation of the fuel supply amount controller 31 which controls the amount of fuel supplied to the engine E, and the operation of the starter motor 32, and also conducts the control of the ignition timing and the like. For this reason, the following signals are inputted into FIECU 12: a signal from a vehicle velocity sensor S1 which detects the vehicle velocity V based on the rotation of the drive shaft in transmission T, a signal from an engine rotational speed sensor S2, which detects the engine rotational speed NE, a signal from a shift position sensor S3, which detects the shift position of transmission T, a signal from brake switch S4, which detects the operation of the brake pedal 33, a signal from the clutch switch S5, which detects the operation of the clutch pedal 34, a signal from throttle opening state sensor S6, which detects the throttle opening state (e.g., a throttle opening degree, or a throttle opening amount) TH, and a signal from intake pipe negative pressure sensor S7, which detects the intake pipe negative pressure PB.

Battery ECU 13 protects battery 22 and calculates the remaining capacity SOC of battery 22. CVTECU 14 conducts the control of CVT (Continuously Variable Transmission).

Figure 2:
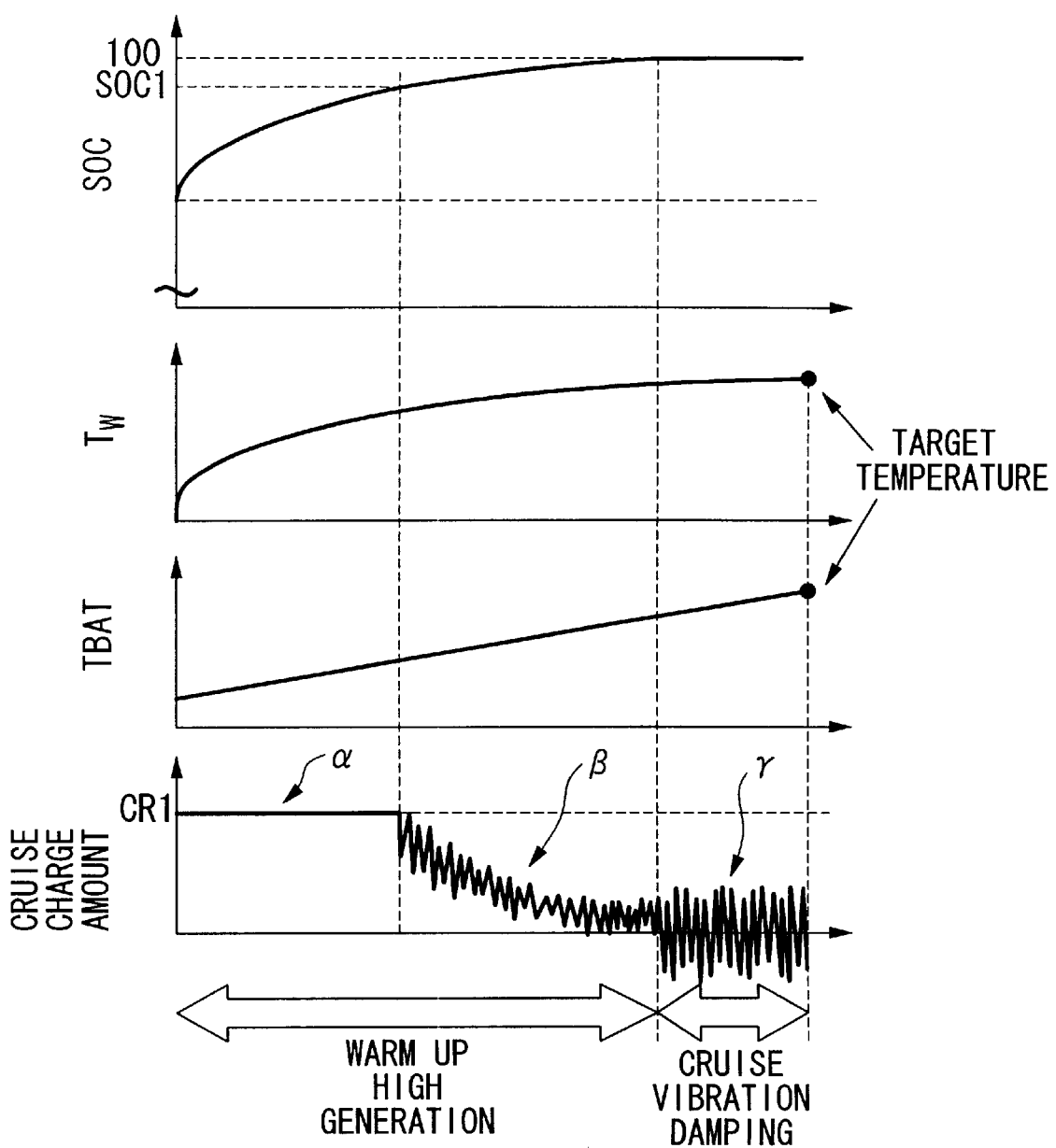
FIG. 2 contains graphs which show, during the operation of the hybrid vehicle control system depicted in FIG. 1, the change in the battery state of charge (also referred to as the "remaining charge") SOC, the change in the engine water temperature TW, the change in the battery temperature, and the change in the cruise charge amount.
Figure 3:
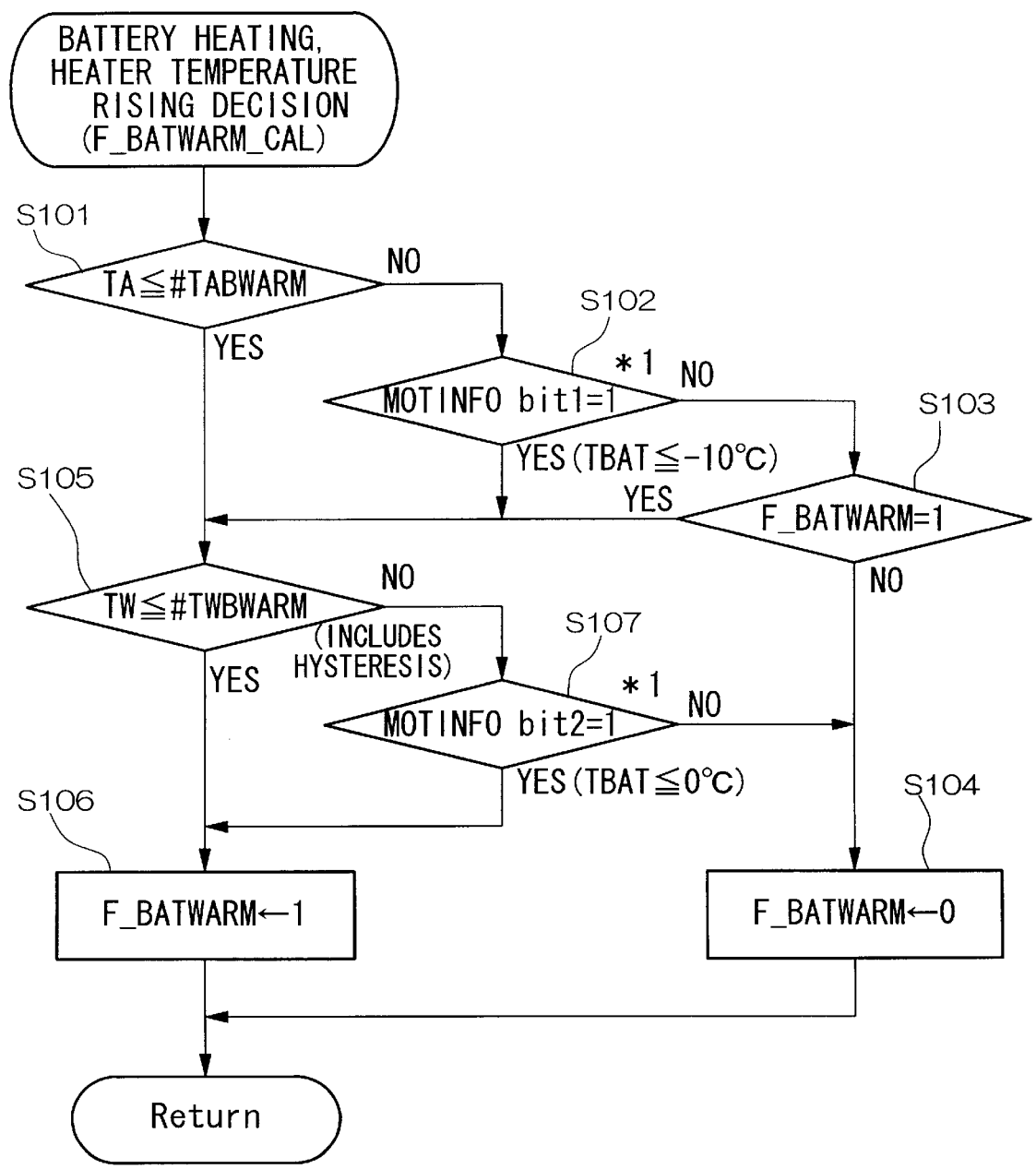
FIG. 3 is a flowchart showing the process of determination for conducting, among the operations of the hybrid vehicle control system shown in FIG. 1, the heating of the battery and the raising of the temperature of the heater.
Figure 4:
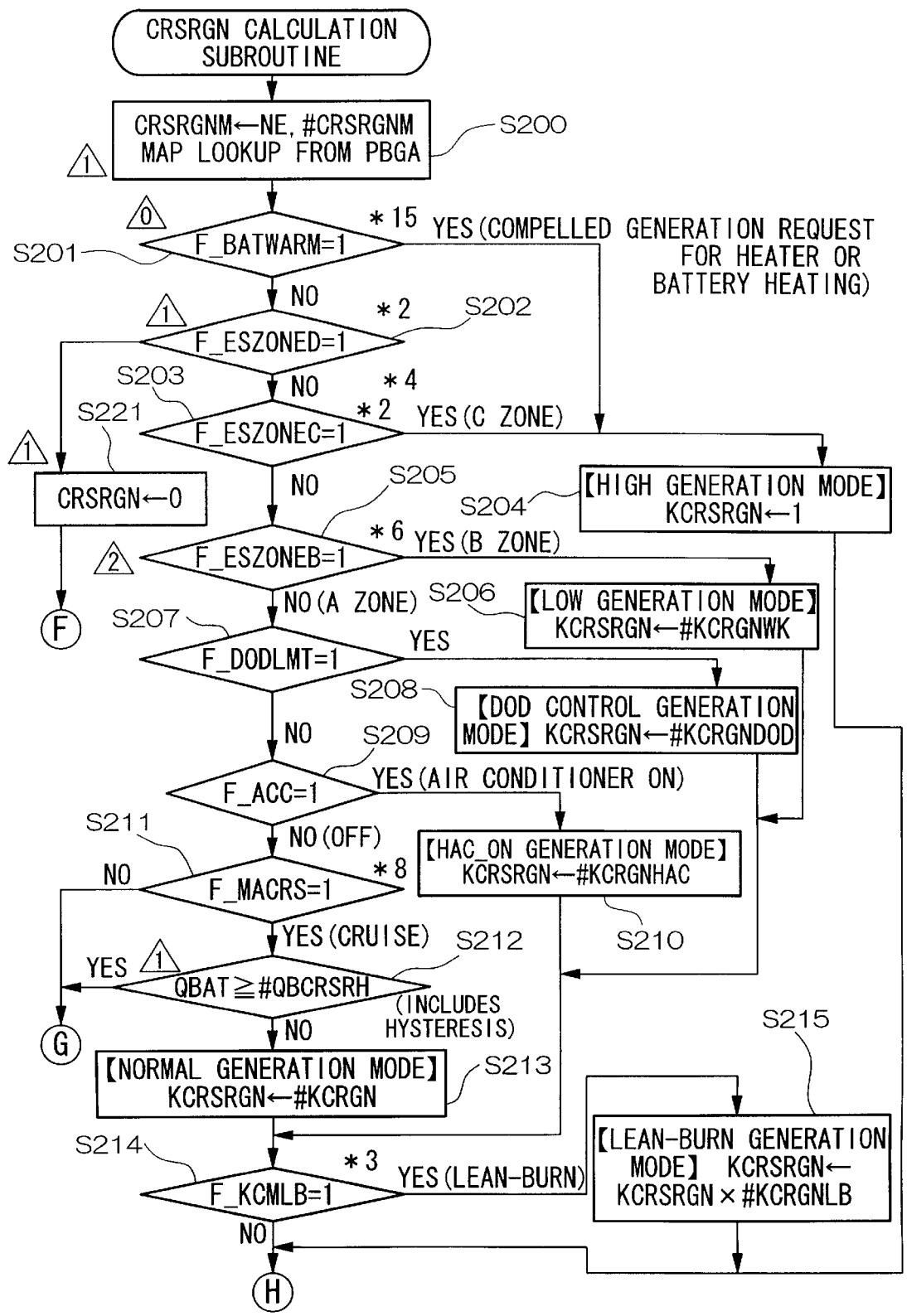
FIG. 4 is a flowchart showing the operation of the hybrid vehicle control system in cruise mode.
Figure 5:
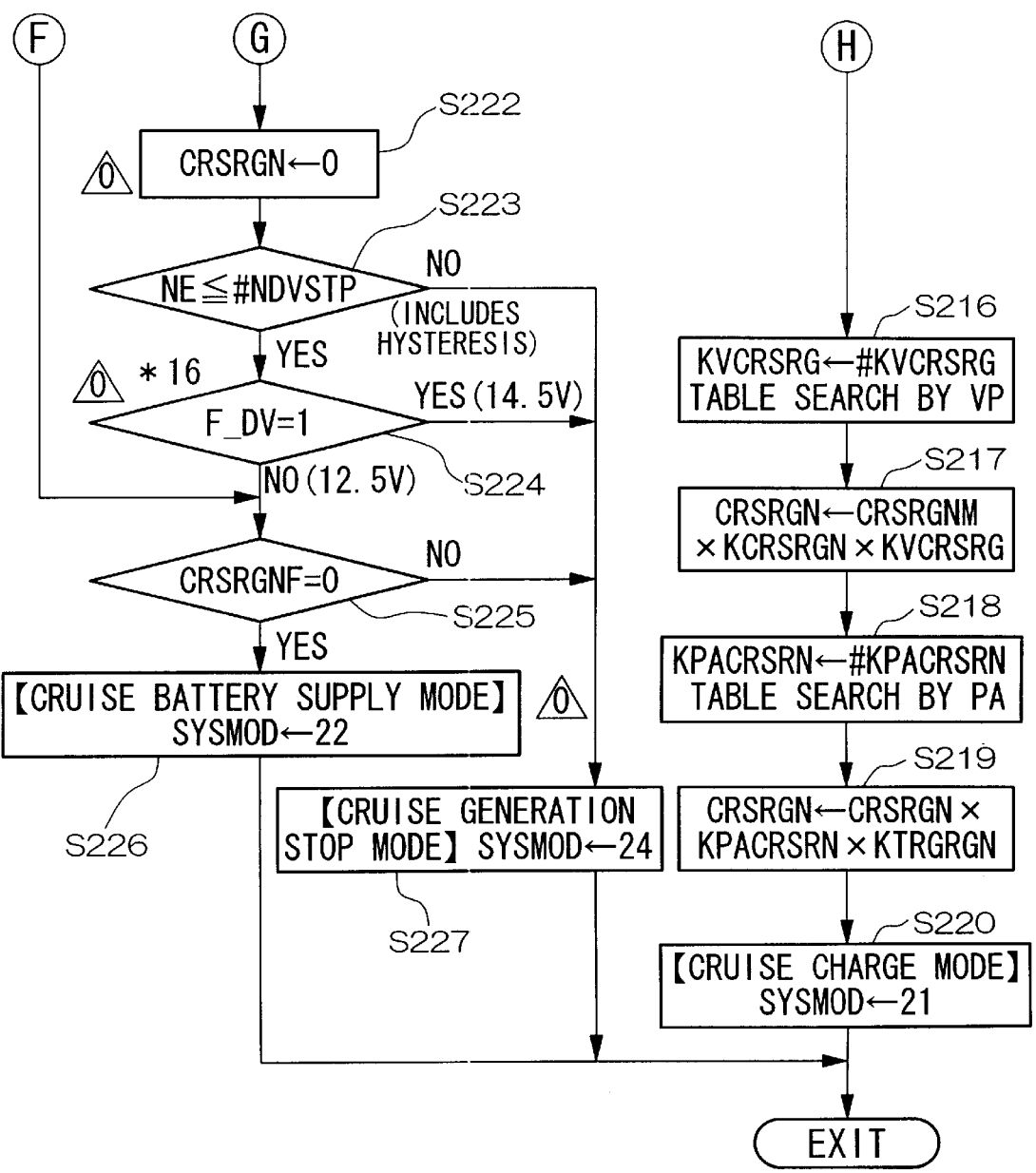
FIG. 5 is a flowchart showing the operation of the hybrid vehicle control system in cruise mode.
Figure 6:
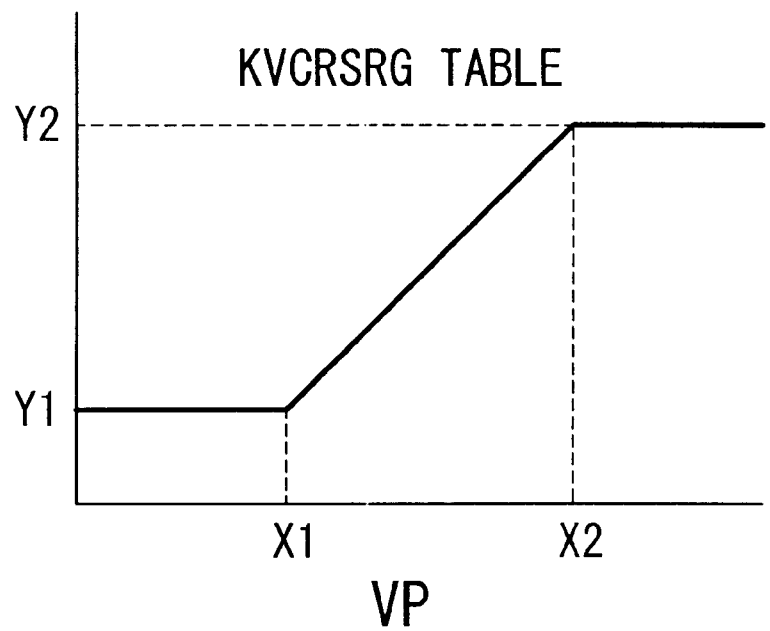
FIG. 6 is a graph showing the cruise power generation amount subtraction coefficient KVCRSRG with respect to the engine control vehicle velocity VP.
Figure 7:
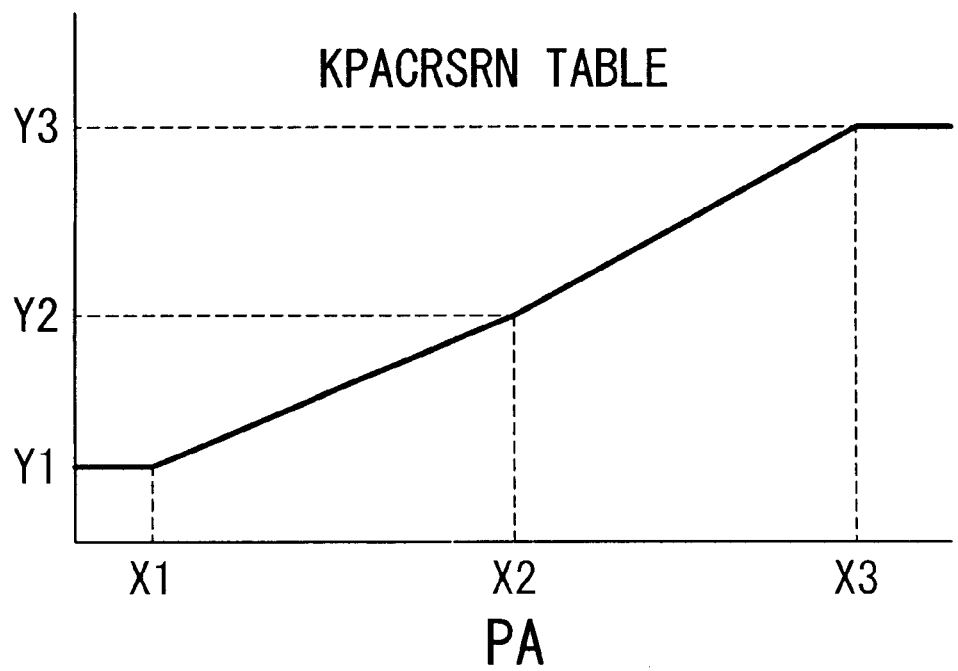
FIG. 7 is a graph showing the cruise power generation amount correction coefficient KPACRSRN with respect to the atmospheric pressure PA for control.
Figure 8:
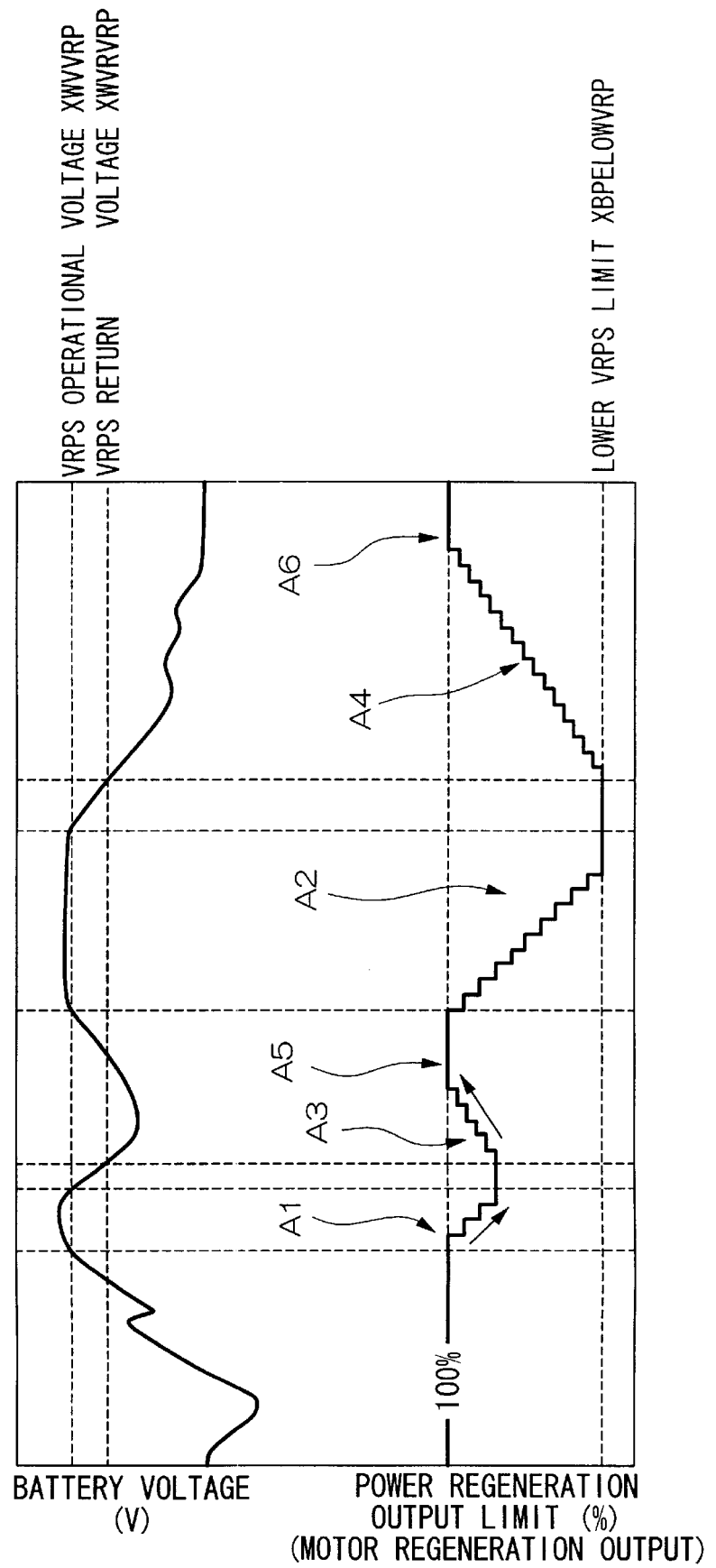
FIG. 8 shows the operation of the regeneration power save by means of the battery voltage.
Figure 9:
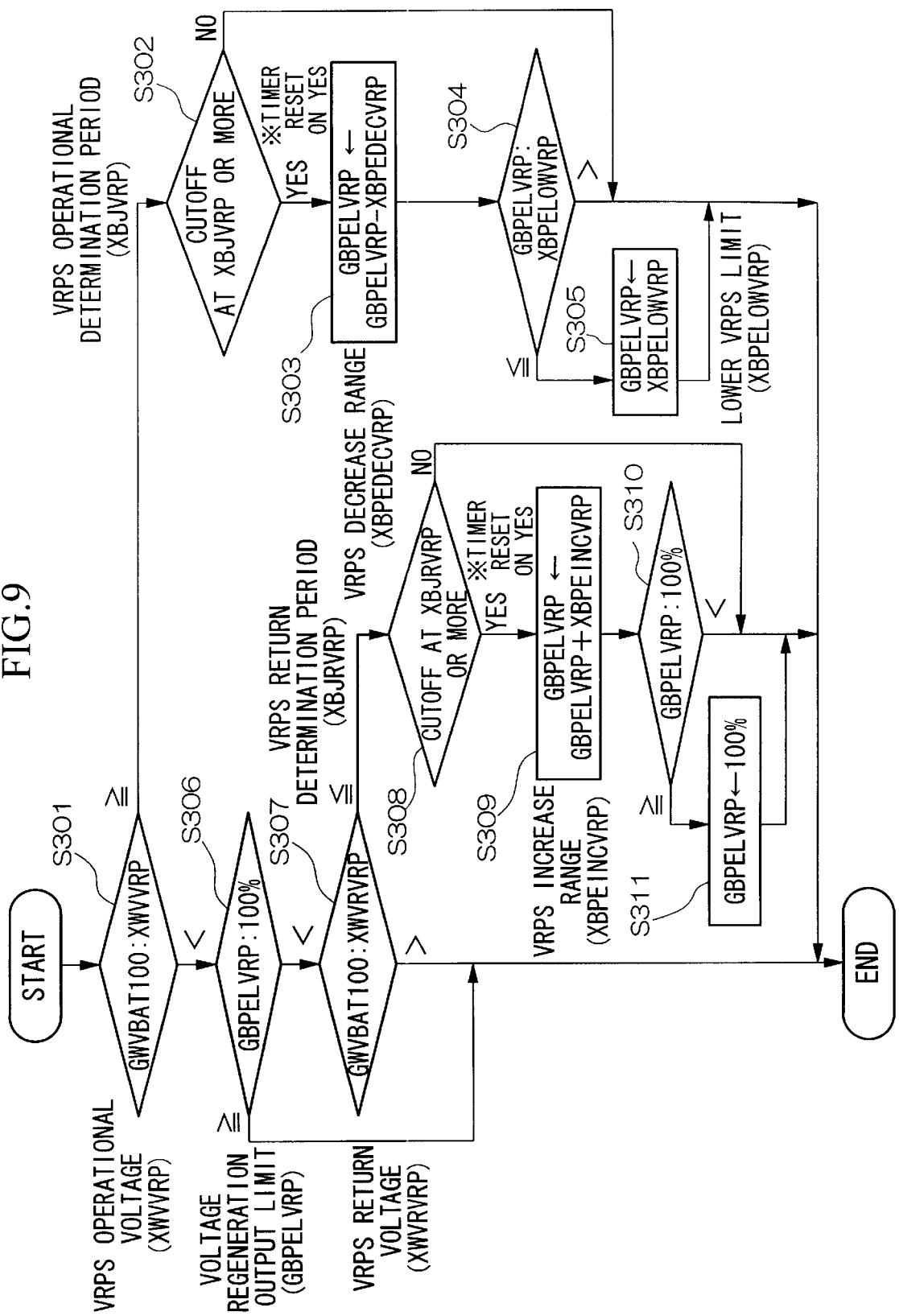
FIG. 9 is a flowchart showing the operation of the regeneration power save by means of the battery voltage.
Figure 10:
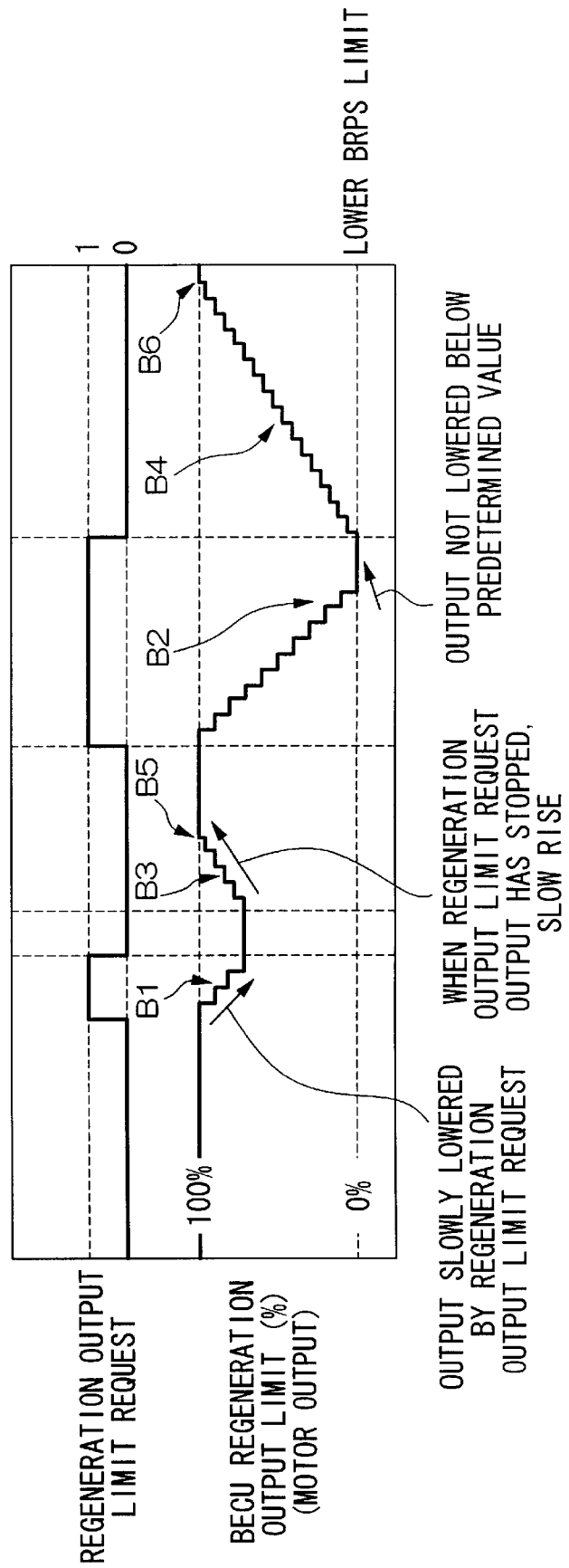
FIG. 10 shows the operation of the regeneration power save based on a request from the battery ECU.
Figure 11:
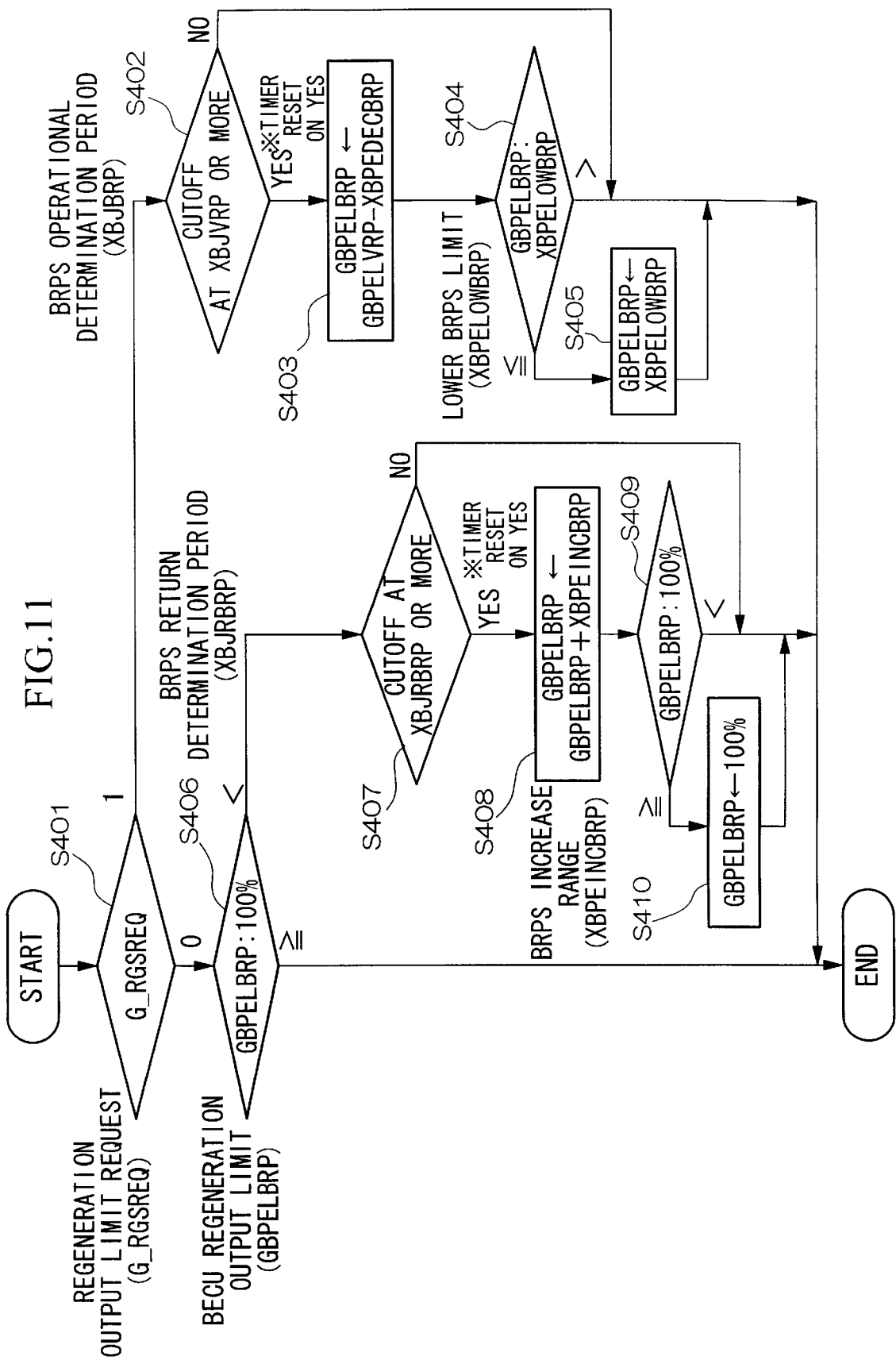
FIG. 11 is a flowchart showing the operation of the regeneration power save based on a request from the battery ECU.
Figure 12:
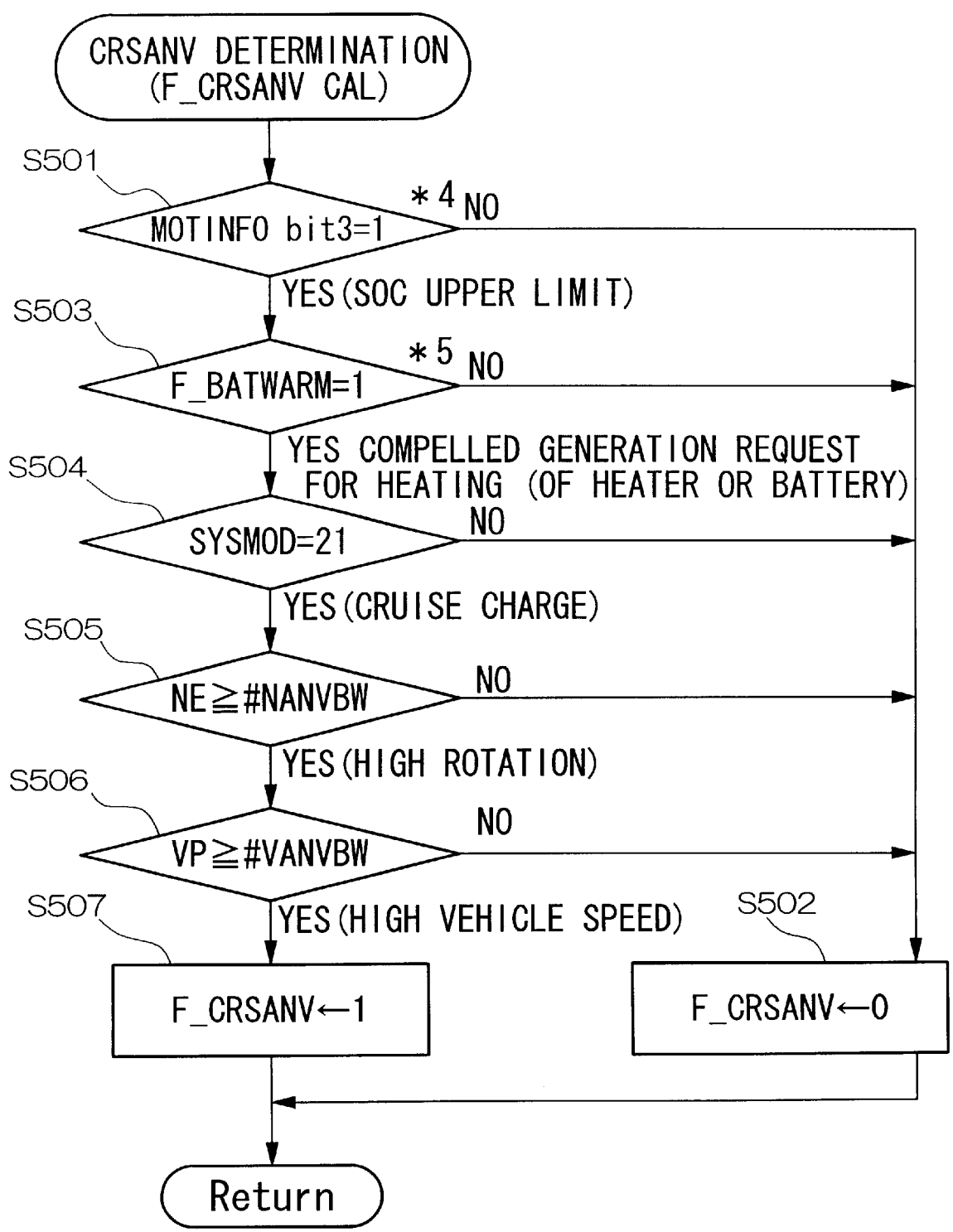
FIG. 12 is a flowchart showing the determination process for conducting vibration damping control in cruise mode.
Figure 13:
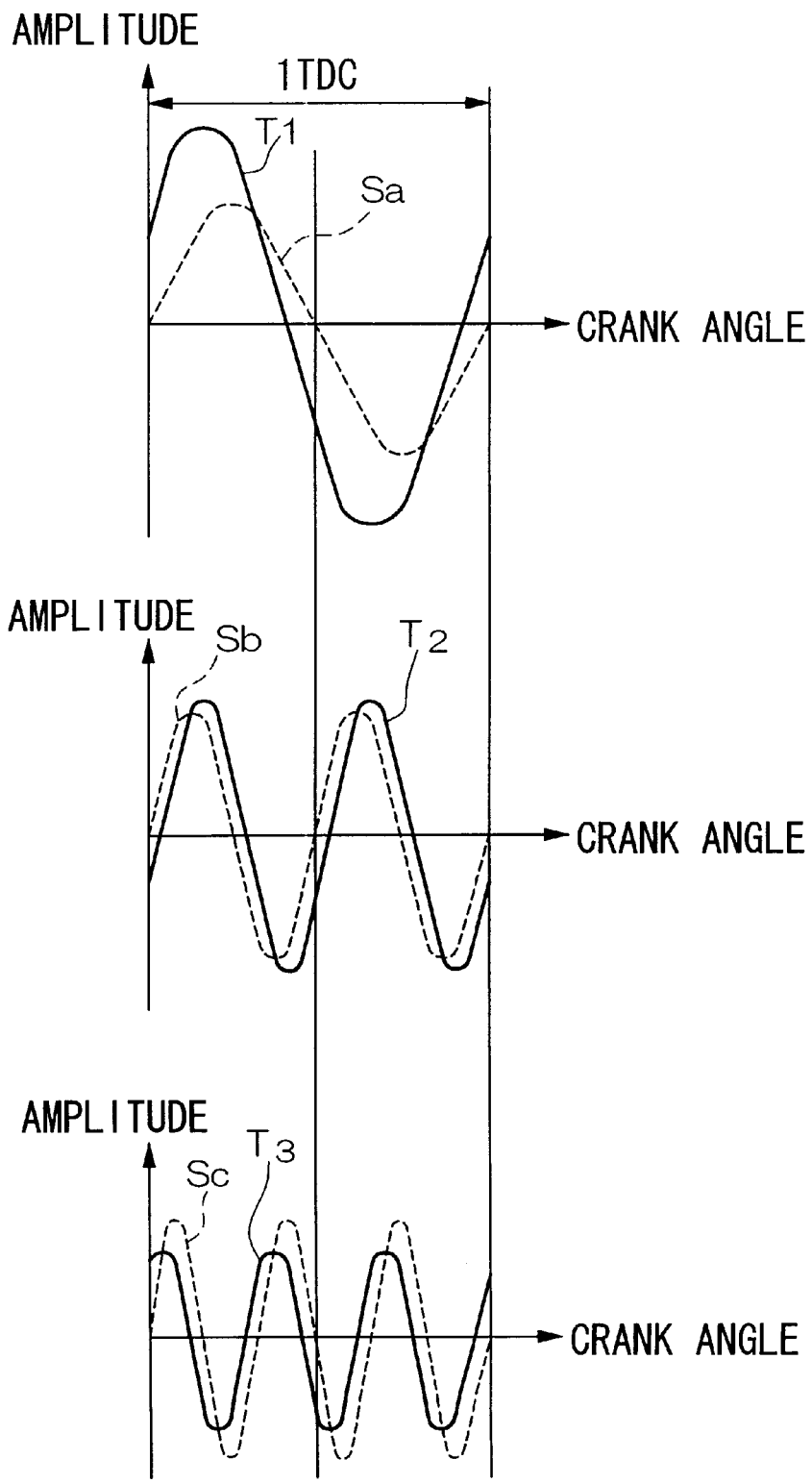
FIG. 13 shows various frequency components which comprise the drive force waveform applied to the motor in vibration damping control: the uppermost graph shows a first order sine wave having a frequency which is one time the fundamental frequency which has the same period as the TDC, the middle graph shows a second order sine wave having a frequency which is two times that of the fundamental frequency, and the lowermost graph shows a third order sine wave having a frequency which is three times that of the fundamental frequency.
Figure 14:
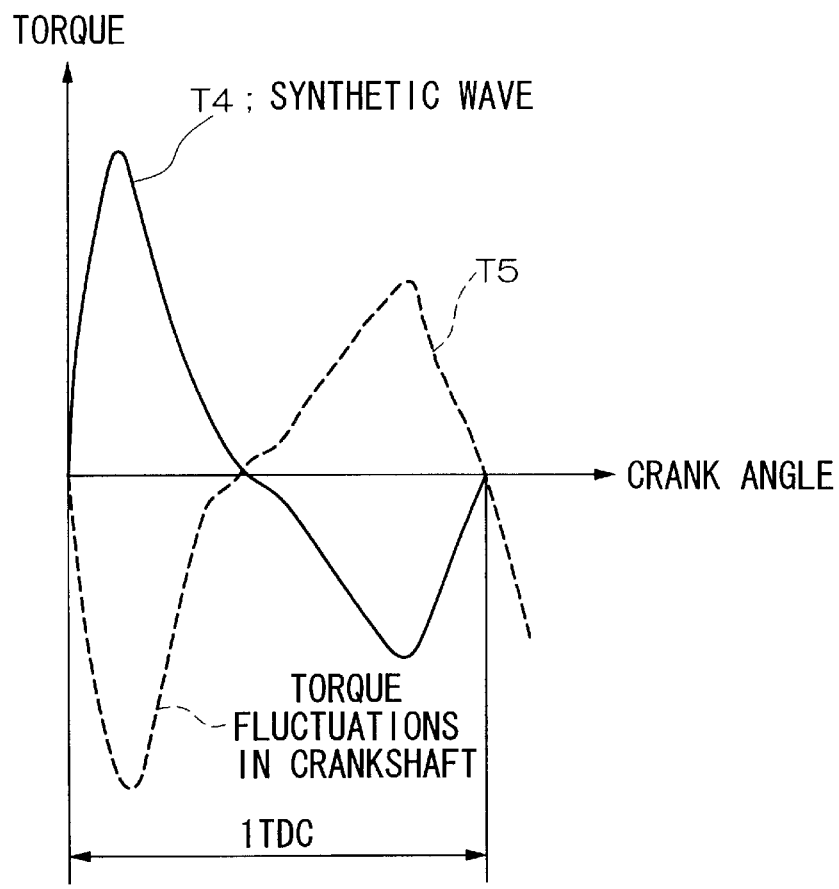
FIG. 14 shows the periodic fluctuation in the drive force of engine E (dotted line) and the drive force waveform applied to the motor (solid line).

The hybrid vehicle control system 1 in accordance with the present embodiment is provided with the composition described above, and next, the operation of the hybrid vehicle control system 1 will be explained with reference to the figures. FIG. 2 depicts the change in the battery remaining capacity SOC, the change in the engine water temperature TW, the change in the battery temperature TBAT, and the change in the cruise charge amount during operation of the hybrid vehicle control system shown in FIG. 1; FIG. 3 is a flowchart showing the decision process, among the operation of the hybrid vehicle control system 1 shown in FIG. 1, for controlling the heating of the battery and the increase in temperature of the heater; FIGS. 4 and 5 are flowcharts showing the operation of the hybrid vehicle control system 1 in cruise mode; FIG. 6 is a graph showing the cruise power generation amount subtraction coefficient KVCRSRG with respect to the engine control vehicle velocity VP; FIG. 7 is a graph showing the cruise power generation amount correction coefficient KPACRSRN with respect to the control atmospheric pressure PA; FIG. 8 shows the operation of the regeneration power save of the battery voltage; FIG. 9 is a flowchart showing the operation by the regeneration power save by the battery voltage; FIG. 10 shows the operation of the regeneration power save based on the requests from the battery ECU; FIG. 11 is a flowchart showing the operation of the regeneration power save based on the requests from the battery ECU; FIG. 12 is a flowchart showing the decision process for conducting vibration damping control in cruise mode; FIG. 13 shows various frequency components comprising the drive force waveform applied to the motor in vibration damping control, where the uppermost graph shows the first order sine wave having one time the frequency of the fundamental frequency of the same period as the TDC, the middle graph shows the second order sine wave having two times the frequency of the fundamental frequency, and the lowermost graph shows the third order sine wave having three times the frequency of the fundamental frequency; and FIG. 14 shows the periodic fluctuation (dotted line) of the drive force of engine E, and the drive force waveform (solid line) applied to the motor.

Hereinbelow, the decision process of the battery heating and the heater temperature rising will be explained with reference to the attached figures.

As shown in FIG. 3, first, a determination is made as to whether the air intake temperature TA is at or below a predetermined lower limit temperature #TABWARM (step S101). Here, the lower limit temperature #TABWARM is not particularly restricted; an example thereof is −10° C. If the result of this determination is "YES", then processing is conducted from step S105 onward, which is described hereinbelow.

On the other hand, when the result of the determination is "NO", then a determination is made as to whether the temperature TBAT of battery 22 is less than or equal to a predetermined temperature T1, for example, −10° C. (step S102). When the result of this determination result is "YES", then the processes from step S105 described hereinbelow are conducted. The state in which the determination is "YES" is one in which, after parking for a long period of time overnight in a cold place or the like, the outside temperature increases in the morning, but the change in the temperature of the battery 22 is slight, so that the temperature thereof is still low; in such a case, the battery 22 is heated.

On the other hand, when the results of the determination are "NO", then a determination is made as to whether or not the battery heating/heater temperature rising control request flag F_BATWARM has been set to "1" in order to raise the temperature of a heater (not depicted in the figure) or to heat the battery 22; that is to say, a determination is made as to whether the battery 22 is already being heated (step S103). When the results of this determination are "YES", then the processing from step S105 described hereinbelow is conducted. On the other hand, when the results of this determination are "NO", then it is not necessary to raise the temperature of the heater or to heat the battery 22, and the battery heating/heater temperature rising control request flag F_BATWARM is set to "0" (step S104), and this series of processes is terminated.

In step S105, a determination is made as to whether the engine water temperature TW is at or below a predetermined lower limit temperature #TWBWARM. Here, the lower limit temperature #TWBWARM is not particularly restricted; it may be, for example, 0° C.

When the results of this determination are "YES", that is to say, when the vehicle has been parked for a long period of time in a cold place or the like, then the battery heating/heater temperature rising control request flag F_BATWARM is set to "1" (step S106), and this series of processes is terminated.

On the other hand, when the results of the determination are "NO", then a determination is made as to whether the battery temperature TBAT is at or below a predetermined temperature T2, for example, 0° C. (step S107). When the results of this determination are "NO", then a judgment is reached that the engine water temperature TW and the battery temperature TBAT are sufficiently high, and the processing from step S104 onward, which serves to terminate the compulsory power generation process for raising the temperature of the heater or for heating the battery 22, is conducted.

On the other hand, when the results of this determination are "YES", then a judgment is made that the battery temperature TBAT is not sufficiently high, and the processing from step S106 onward is conducted.

Accordingly, the conditions under which processing for raising the temperature of the heater or for heating the battery 22 is initiated are the case in which, of the battery temperature TBAT of the battery 22 and the engine water temperature TW, at least one has not reached a predetermined temperature, while the termination conditions are those in which both the battery temperature TBAT and the engine water temperature TW have reached predetermined temperatures.

Next, the target power generation amount calculation process during cruise will be explained with reference to the attached figures.

As shown in FIGS. 4 and 5, first, in step S200, the cruise power generation amount CRSRGNM is looked up on a map. This map shows the power generation amount which is determined by the engine rotational speed NE and the intake pipe negative pressure PBGA; exchange of MT and CVT is conducted (not depicted in the figure).

Next, in step S201, the flag value of battery heating/heater temperature rising control request flag F_BATWARM is determined. If the results of the determination in step S201 are "YES", that is to say, when a determination is made that the battery heating/heater temperature rising control request flag F_BATWARM is "1", then control proceeds to step S294, and "1" is substituted for the correction coefficient KCRSRGN of the cruise power generation amount (high generation mode) and control proceeds to step S216.

When the results of the determination in step S201 are "NO", then control proceeds to step S202, and a determination is made as to whether the energy storage zone D determination flag F_ESZONED has a value of "1".

In the present embodiment, in battery ECU 13, the battery remaining capacity SOC which is calculated based, for example, on voltage, charge current, temperature, and the like is divided into zones (the so-called zoning), and a plurality, for example, 4, of zones A, B, C, and D are set up. Using zone A (from SOC 40% to SOC 80% through 90%), which is the region which is normally employed, as a base, division is conducted such that a zone B (from SOC 20% to SOC 40%), which is a provisionally employed region, is below this, and further below this, there is a zone C (from SOC 0% to SOC 20%), which is an overdischarge region. Furthermore, a zone D (from SOC 80% through 90% to 100%) is provided above zone A; this is the overcharge region.

When the results of the determination are "YES", that is to say, when a determination has been made that the battery remaining capacity SOC is in the zone D of overcharge, control proceeds to step S221, a value of "0" is set in the cruise power generation amount, and control proceeds to step S225. In step S225, a determination is made as whether the final cruise power generation command value CRSRGNF has the value of "0". As a result of the determination in step S225, when it has been determined that the command value is not "0", then control proceeds to step S227, a transfer is effected to cruise power generation stop mode, and control is terminated. When a determination is made that the command value is "0" as a result of the determination in step S225, then control proceeds to step S226, a transfer is effected to the cruise battery supply mode, and control terminates.

When the results of the determination in step S202 are "NO", that is to say, when it has been determined that the battery remaining capacity SOC is not in the overcharged state zone D, then control proceeds to step S203, and a determination is made as to whether the energy storage zone C determination flag F_ESZONEC is "1". When the results of this determination are "YES", that is to say, when it has been determined that the battery remaining capacity SOC is in the overdischarge state zone C, then control proceeds to step S204.

On the other hand, when the results of the determination in step S203 are "NO", then control proceeds to S205.

In step S205, a determination is made as to whether the energy storage zone B determination flag F_ESZONEB is "1". When the results of this determination are "YES", in other words, when it is determined that the region is that of provisional use of battery 22 and is the zone B which charges to a lesser amount than zone C, control proceeds to step S206. In step S206, the correction coefficient KCRSRGN of the cruise power generation amount is replaced by the cruise power generation amount coefficient #KCRGNWK (for use in the low generation mode), and control proceeds to step S214.

On the other hand, when the results of the determination in step S205 are "NO", then control proceeds to step S207, and here, a determination is made as to whether the DOD (Depth of Discharge) limit determination flag F_DODLMT flag value is "1". When the results of the determination in step S207 are "YES", then control proceeds to step S208, and the correction coefficient KCRSRGN of the cruise power generation amount is replaced by the cruise power generation amount coefficient #KCRGNDOD (used for the battery DOD limited power generation mode which is conducted in the case in which the battery charge amount exceeds a predetermined amount), and control proceeds to step S214. On the other hand, when the results of the determination in step S207 are "NO", then control proceeds to step S209, and a determination is made as to whether the air conditioner ON flag F_ACC flag value is "1". When the results of this determination are "YES", that is to say, when a determination is made that the air conditioner is "ON", then control proceeds to step S210, and the correction coefficient KCRSRGN of the cruise power generation amount is replaced by the cruise power generation amount coefficient #KCRGNHAC (used in the HAC_ON (High Altitude Compensator_ON) power generation mode), and control proceeds to step S214.

When the results of the determination in step S209 are "NO", that is to say, when a determination is made that the air conditioner is "OFF", then control proceeds to step S211, and a determination is made as to whether the flag value of the cruise operation determination flag F_MACRS is "1". When the results of the determination of step S211 are "NO", that is to say, when it has been determined that the mode is not the cruise mode, control proceeds to step S222, and "0" is substituted for the cruise power generation amount CRSRGN, and control proceeds to step S223. In step S223, a determination is made as to whether the engine rotational speed NE is equal to or below an upper limit engine rotational speed #NDVSTP for executing the cruise battery supply mode, and when the results of this determination are "YES", that is to say, when a determination has been made that the engine rotational speed NE is less than or equal to the upper limit engine rotational speed #NDVSTP for executing the cruise battery supply mode, then control proceeds to step S224. When the results of the determination in step S223 are "NO", that is to say, when a determination has been made that the engine rotational speed NE is greater than the upper limit engine rotational speed #NDVSTP for executing the cruise battery supply mode, control proceeds to step S227. The upper limit engine rotational speed #NDVSTP for executing the cruise battery supply mode described above is a value which has hysteresis.

In step S224, a determination is made as to whether the flag value of the 12V system power generation necessity flag F_DV is "1". When the results of this determination are "YES", that is to say, when the load on the 12V system is high, then control proceeds to S227. Furthermore, when the results of the determination in step S224 are "NO", that is to say, when the load on the 12V is low, then control proceeds to step S225.

In step S212, a determination is made as to whether the residual capacity QBAT of the battery is equal to or greater than the upper limit residual capacity #QBCRSRH (having the same meaning as the battery remaining capacity SOC provided at the upper limit of zone A) for execution of the normal power generation mode. The upper limit residual capacity #QBCRSRH for execution of the normal power generation mode described above is a value which has hysteresis. When the results of the determination in step S212 are "YES", that is to say, when a determination has been made that the battery residual capacity QBAT is greater than or equal to the upper limit residual capacity #QBCRSRH for execution of the normal power generation mode, control passes to step S222. When the battery residual capacity QBAT is less than the upper limit residual capacity #QBCRSRH for execution of the normal power generation mode, then control passes to step S213, and here, the correction coefficient KCRSRGN of the cruise power generation amount is replaced by the cruise power generation amount coefficient #KCRGN (used in the normal power generation mode), and control passes to step S214.

In step S214, a determination is made as to whether the flag value of the lean-burn determination flag F_KCMLB is "1". When the results of this determination are "YES", that is to say, when the lean-burn determination has been made, then in step S215, a value representing a multiplication of the correction coefficient KCRSRGN of the cruise power generation amount multiplied by the cruise power generation amount coefficient #KCRGNLB (for use in the lean-burn power generation mode) is substituted for the correction coefficient KCRSRGN of the cruise power generation amount, and control proceeds to step S216 When the results of the determination of step S214 are "NO", that is to say, when a determination is made that the mode is not the lean-burn mode, then control proceeds to step S216.

In step S216, the cruise power generation amount subtraction coefficient KVCRSRG shown in FIG. 6 is obtained by a #KVCRSRG table lookup using the vehicle velocity VP for engine control. Next, in step S217, a value representing a multiplication of the cruise power generation amount map value CRSRGNM by the cruise power generation amount correction coefficient KCRSRGN and the cruise power generation amount subtraction coefficient KVCRSRG is substituted for the cruise power generation amount CRSRGN. Then, control proceeds to step S218, and the cruise power generation amount PA correction coefficient KPACRSRN shown in FIG. 7 is obtained by #KPACRSRN table lookup using the atmospheric pressure PA for control.

Then, in step S219, the cruise power generation amount CRSRGN is multiplied by the cruise power generation amount PA correction coefficient KPACRSRN determined in step S218 and by the cruise power generation amount subtraction coefficient KTRGRGN, and thus the final cruise power generation amount CRSRGN is determined, and in step S220, transfer is effected to the cruise charge mode.

Accordingly, when, in step S201, transfer is made to the high generation mode (step S204) which serves to heat the battery and raise the temperature of the heater, as shown by the region α in FIG. 2, the cruise power generation amount, which is normally assumed to be effectively 0, is increased by the predetermined value CR1, for example, approximately 2 kW, and charging continues with respect to battery 22 until a value of "0" is set in the battery heating/heater temperature rising control request flag F_BATWARM, that is to say, until both the battery temperature TBAT and the engine water temperature TW have reached predetermined values. Then, by increasing the charging current supplied to battery 22, Joule heat is generated by the internal resistance of battery 22 and the battery temperature TBAT rises as shown by FIG. 2, and by increasing the load on engine E, the engine water temperature TW rises, as shown in FIG. 2.

In this case, since the processing from step S202 onward, that is to say, the determination of the residual capacity of the battery 22, is not conducted (is skipped), even in the case in which the battery 22 reached the overcharge region in which the cruise charge amount is normally set to 0, charging would continue, and the internal resistance of the battery 22 would further increase.

Even if charging continued when battery 22 was in an overcharged state, as described above, When the battery temperature TBAT is low, the possibility of damage to the battery 22 may be ignored. Furthermore, it is impossible to ensure the output necessary for high generation during lean burn, so that in the high generation mode, the lean-burn mode is compulsorily canceled in FIECU 12.

Figure 15:
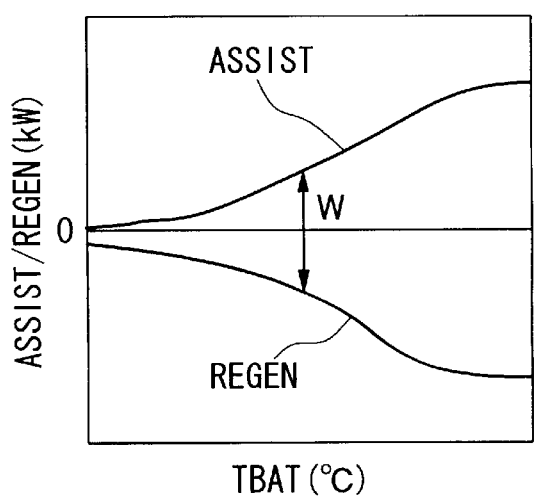
FIG. 15 is a graph showing the upper limit values of the assistance amount and the regeneration power generation amount of the motor in accordance with the battery temperature.

However, a shown by the region β in FIG. 2, when, for example, the battery remaining capacity SOC has reached the predetermined value SOC1, or when a predetermined voltage change has been detected in battery 22, it is determined that battery 22 is in a state in which it is nearly fully charged, and switching is conducted to power generation in the voltage power save range, that is to say, to power generation within the acceptance width W between the assist power save line ASSIST and the regeneration power save line REGEN shown in FIG. 15, and regeneration power save control is conducted in which the cruise charge amount is gradually reduced from the predetermined value CR1 to essentially 0.

This regeneration power save control comprises voltage regeneration power save processing, in which motor ECU 11 conducts regeneration power save based on the total voltage of battery 22, and regeneration power save processing, which is conducted as a result of a request sent from battery ECU 13 to motor ECU 11 based on the voltage of each module comprising battery 22.

First, the voltage regeneration power save, in which control is conducted based on the total voltage of battery 22, will be explained with reference to FIGS. 8 and 9.

First, the average battery voltage GWVBAT100, taken over a predetermined period of time, for example, 100 ms, is compared with a predetermined VRPS operational voltage XWVVRP (step S301). When the results of this determination show that the average battery voltage GWVBAT100 is less than VRPS operational voltage XWVVRP, then the processing from step S306, described hereinbelow, onward is conducted.

On the other hand, when the results of the determination are such that the average battery voltage GWVBAT100 is greater than or equal to VRPS operational voltage XWVVRP, then counting is initiated by a timer, and a determination is made as to whether this continues for the period of predetermined VRPS operational determination period XBJVRP (step S302). When the results of this determination are "NO", then this series of processes is terminated.

On the other hand, when the results of the determination are "YES", then the timer is reset, and a value representing the result of subtracting a predetermined VRPS decrease range XBPEDECVRP from the power regeneration output limit GBPELVRP (%) is set as the new power regeneration output limit GBPELVRP (%) (step S303).

Then, this newly established power regeneration output limit GBPELVRP (%) is compared with a predetermined lower VRPS limit XBPELOWVRP, such as, for example, 0 or the like (step S304). When the results of this determination are such that the power regeneration output limit GBPELVRP is greater than the lower VRPS limit XBPELOWVRP, then this series of processes is terminated, and as in the region A1 shown in FIG. 8, the power regeneration output limit GBPELVRP (%), that is to say, the cruise charge amount, is slowly reduced.

On the other hand, when the results of the determination are such that the power regeneration output limit GBPEL-VRP is less than or equal to the lower VRPS limit XBPELOWVRP, then a predetermined lower VRPS limit XBPELOWVRP is set as the new power regeneration output limit GBPELVRP (step S305). That is to say, as in the region A2 shown in FIG. 8, the power regeneration output limit GBPELVVRP does not become lower than the predetermined lower VRPS limit XBPELOWVRP.

On the other hand, if the results of the determination in step S301 are such that the average battery voltage GWV-BAT100 is less than VRPS operational voltage XWVVRP, then the power regeneration output limit GBPELVRP is compared with a predetermined value, for example, 100% (step S306). When the results of this determination are such that the power regeneration output limit GBPELVRP is greater than or equal to 100%, this series of processes is terminated.

On the other hand, when the results of the determination are such that the power regeneration output limit GBPEL-VRP is less than 100%, then the average battery voltage GWVBAT 100 is compared with a predetermined VRPS return voltage XWVRVRP (step S307). The VRPS return voltage XWVRVRP is set so as to be lower than the VRPS operational voltage XWVVRP. When the results of this determination are such that the battery voltage GWVBAT 100 is greater than the VRPS return voltage XWVRVRP, that is to say, when the average battery voltage GWVBAT 100 is positioned between the VRPS return voltage XWVRVRP and the VRPS operational voltage XWVVRP, this series of processes is terminated.

On the other hand, where the results of the determination are such that the battery voltage GWVBAT 100 is less than or equal to the VRPS return voltage XWVRVRP, then counting is initiated by a timer, and a determination is made as to whether this continues for the period of a predetermined VRPS return determination period XBJRVRP (step S308). When the results of this determination are "NO", then this series of processes is terminated.

On the other hand, when the results of the determination are "YES", then the timer is reset, and a value representing the result of the addition of the power regeneration output limit GBPELVRP (%) and a predetermined VRPS increase range XBPEINCVRP is established as a new power regeneration output limit GBPELVRP (%) (step S309).

Then, the newly set power regeneration output limit GBPELVRP (%) is compared with a predetermined upper limit, for example, 100% (step S310). When the results of the determination are such that the power regeneration output limit GBPELVRP is less than 100%, then this series of processes is terminated, and in the manner of regions A3 and A4 shown in FIG. 8, the power regeneration output limit GBPELVRP (%), that is to say, the cruise charge amount, is gradually increased.

On the other hand, when the results of this determination are such that the power regeneration output limit GBPEL-VRP is greater than or equal to 100%, then 100% is set as the new power regeneration output limit GBPELVRP (step S311). In other words, as in the regions A5 and A6 shown in FIG. 8, the power regeneration output limit GBPELVRP does not go above an upper limit, for example, 100%.

Next, the operation of the regeneration power save, which is conducted by means of a request sent from battery ECU 13 to motor ECU 11 based on the voltage of each module comprising battery 22, will be explained with reference to FIGS. 10 and 11.

In this case, the voltage of the various modules is read into battery ECU 13, and a determination is made as to whether the regeneration output limit request flag G_RGSREQ has been set to "1". If the regeneration output limit request flag G_RGSREQ has been set to "1", then this data is sent from battery ECU 13 to motor ECU 11, and in motor ECU 11, processing is conducted based on the regeneration output limit request flag G_RGSREQ.

First, a determination is made as to whether the regeneration output limit request flag G_RGSREQ has been set to "1" (step S401). When the results of this determination are "NO", then the processing from step S406, described hereinbelow, onward is conducted.

On the other hand, when the results of the determination are "YES", then counting is initiated by a timer, and a determination is made as to whether this continues for the period of a predetermined BRPS operational determination period XBJBRP (step S402). When the results of this determination are "NO", this series of processes is terminated.

On the other hand, when the results of this determination are "YES", then the timer is reset, and a value representing the result of the subtraction of predetermined BRPS decrease range XBPEDECBRP from BECU regeneration output limit GBPELBRP (%), which is the upper limit value of the regeneration amount by motor M, is set as the new BECU regeneration output limit GBPELBRP (%) (step S403).

Then, the newly set BECU regeneration output limit GBPELBRP (%) is compared with a predetermined lower BRPS limit XBPELOWBRP, for example, 0 or the like (step S404). When the results of this determination are such that the BECU regeneration output limit GBPELBRP is greater than the lower BRPS limit XBPELOWBRP, then this series of processes is terminated, and as shown by region B1 shown in FIG. 10, the BECU regeneration output limit GBPELBRP, that is to say, the cruise charge amount, is slowly reduced.

On the other hand, when the results of the determination are such that the BECU regeneration output limit GBPEL-BRP is less than or equal to the lower BRPS limit XBPELOWBRP, the predetermined lower BRPS limit XBPELOWBRP is set as the new BECU regeneration output limit GBPELBRP (step S405). That is say, as in the region B2 shown in FIG. 10, the BECU regeneration output limit GBPELBRP does not drop below the predetermined lower BRPS limit XBPELOWBRP.

On the other hand, in step S401, when the results of the determination of whether the regeneration output limit request flag G_RGSREQ is set to "1" are "NO", then the BECU regeneration output limit GBPELBRP is compared with a predetermined value, for example, 100% (step S406).

When the results of this determination are such that the BECU regeneration output limit GBPELBRP is greater than or equal to 100%, this series of processes is terminated.

On the other hand, when the results of the determination are such that the BECU regeneration output limit GBPELBRP is less than 100%, then counting is initiated by a timer, and a determination is made as whether this continues for the period of a predetermined BRPS return determination period XBJRBRP (step S407). When the results of this determination are "NO", this series of processes is terminated.

On the other hand, when the result of this determination is "YES", then the timer is reset, and a value resulting from the addition of the BECU regeneration output limit GBPELBRP (%) and a predetermined BRPS increase range XBPEINCBRP is set as a new BECU regeneration output limit GBPELBRP (%) (step S408).

Next, the newly set new BECU regeneration output limit GBPELBRP (%) is compared with a predetermined upper limit value, for example, 100% (step S409). When the results of this determination are such that BECU regeneration output limit GBPELBRP is less than 100%, then this series of processes is terminated, and as in the regions B3 and B4 shown in FIG. 10, the BECU regeneration output limit GBPELBRP (%), that is to say, the cruise charge amount, gradually increases.

On the other hand, when the results of the determination are such that the BECU regeneration output limit GBPELBRP is greater than or equal to 100%, then 100% is set as the new BECU regeneration output limit GBPELBRP (step S410). In other words, as in the regions B5 and B6 shown in FIG. 10, the BECU regeneration output limit GBPELBRP does not exceed a predetermined upper limit value, for example, 100%.

In the regeneration power save control described above, between the voltage regeneration power save, which is conducted based on the total voltage of the battery 22, and the regeneration power save, which is conducted based on the voltage of each module comprising battery 22, that processing for which the initiation conditions are first satisfied is executed first. Charging is not interrupted while slowly reducing the cruise charge amount until the battery remaining capacity SOC is essentially fully charged.

Next, as shown by the region γ in FIG. 2, when battery 22 enters an essentially fully charged state, and there is no room to accept further charge, the cruise vibration damping control shown in FIG. 12 is conducted. In other words, the engine water temperature TW is caused to rise by means of the load placed on engine E and the heater is caused to rise in temperature, and this control indirectly heats the battery 22 via a fan or the like.

First, a determination is made as to whether the battery remaining capacity SOC is in excess of a predetermined upper limit value SOC2, for example, SOC 90% (step S50). When the results of this determination are "NO", then the vibration damping control processing request flag F_CRSANV is set to "0" during cruise (step S502), and this series of processes is terminated.

On the other hand, when the results of this determination are "YES", that is to say, when a determination has been made that there is no room in battery 22 to accept further charge, a determination is made as to whether the battery heating/heater temperature rising control request flag F_BATWARM has been set to "1" (step S503). When the results of this determination are "NO", then the processing from step S502 onward is conducted.

On the other hand, when the results of this determination are "YES", then a determination is made as to whether the operational mode of motor M is during cruise charging (step S504), and when the results of this determination are "NO", then processing from step S502 onward is conducted.

On the other hand, when the results of this determination are "YES", then a determination is made as to whether the engine rotational speed NE is equal to or greater than a predetermined value #NANVBW, for example, approximately 800–1000 rpm (step S505). When the results of this determination are "NO", then the processing from step S502 onward is conducted.

On the other hand, when the results of this determination are "YES", then a determination is made as to whether the vehicle velocity VP is equal to or greater than a predetermined value #VANVBW, for example, approximately 15 km/h (step S506). When the results of this determination are "NO", then the processing from step S502 onward is conducted.

On the Other hand, when the results of this determination are "YES", then the vibration damping control processing request flag F_CRSANV during cruising is set to "1" (step S507), and a vibration damping request signal is sent from FIECU 12 to motor ECU 11.

When the vibration damping request signal is sent to motor ECU 11, as shown by the region γ in FIG. 2, a drive force which is opposite in phase to the periodic fluctuations in the drive force of engine E is generated on the motor M side, and cancellation control is conducted with engine E during cruise, in the manner of the vibration suppression apparatus disclosed in, for example, Japanese Unexamined Patent Application, First Publication No. Hei. 11-089008. That is to say, when the drive force of engine E increases, motor M is employed as an electricity generator, and the amount of increase in this drive force is converted to electrical energy, while when the drive force of engine E is reduced, the drive force of engine E is assisted by motor M, and by making for the amount of reduction in the drive force, fluctuations in the drive force of engine E are reduced, and vibrations in engine E generated as a result of fluctuations in the drive force are suppressed.

Next, the operation of the vibration damping control during cruise will be explained. Here, the periodic fluctuation in the drive force of engine E is so comprised that it contains various frequency components of orders which are integral multiples (one time, two times, three times) of a fundamental frequency, where this fundamental frequency is a frequency having the same period as the top dead center (TDC: crank angle period) at the time at which the suction stroke of each cylinder of engine E is initiated.

First, in response to the load state of engine E, which is comprehended by means of the shift position signal from shift position sensor S3, the motor ECU 11 employs a map or the like, and sets the amplitude and phase of, for example, a first order sine wave T1, a second order sine wave T2, and a third order sine wage T3.

Then, at predetermined crank angle positions with respect to the TDC obtained from an engine rotational speed (NE) sensor S2 attached to the periphery of the cam shaft or the crank shaft of engine E which are not depicted, for example, at the TDC signal pulses outputted a crank angles of 240° in a three-cylinder engine, as shown by the dotted lines in FIG. 13, the amplitude and phase of reference sine waves Sa, Sb, and Sc, which have frequencies which are integral multiples, for example, one time, two times, and three times, of a fundamental frequency having the same period as the TDC, are adjusted, and as shown by the solid lines in FIG. 13, a first order sine wave T1, a second order sine wave T2, and a third order sine wave T3 are generated. Here, the first through third order sine waves T1, T2, and T3 are set so as to have the opposite phase from the frequency components having frequencies which are integral multiples, for example, one time, two times, and three times, of the fundamental frequency having the same period as the TDC, among the frequency components comprising the periodic fluctuation of the drive force of engine E.

Then, by mutually adding the level values in each phase level of first through third order sine waves T1, T2, and T3, a synthetic wave T4 such as that shown by the solid line in FIG. 14 is generated. This synthetic wave T4 has a waveform which essentially cancels the periodic fluctuation in the drive force of engine E, that is to say, the waveform T5 of the torque fluctuation of the crank shaft shown by the dotted line in FIG. 14.

Motor ECU 11 determines the torque value with respect to the rotational angle (crank angle) of the crank shaft from synthetic wave T4, based on rotational angle position data of the crank shaft (not depicted in the figure) obtained from motor M, and outputs this to the power drive unit 21. The power drive unit 21 controls the motor M in accordance with the torque value obtained, and thereby, a torque which serves to cancel the torque fluctuation of engine E is applied to the crank shaft from motor M, and torque fluctuation of engine E is suppressed, and vibration of engine E is also suppressed.

In the vibration damping control during cruise, there is no reduction in the load on engine E; however, by means of an increase in the engine water temperature TW, the battery 22 is heated, and the battery temperature TBAT is caused to raise at an early point in time, and thereby, the assistance amount of motor M and an increase in the regeneration power generation amount are promoted, and when viewed from the point of view of overall vehicle operation, fuel consumption is improved.

By means of the hybrid vehicle control system 1 of the present embodiment, during vehicle operation in the cruise mode, a value "1" is substituted for the cruise power generation amount correction coefficient KCRSRGN (high generation mode) and the cruise power generation amount CRSRGN, which is normally essentially 0, is raised to the predetermined value CR1, for example, approximately 2 kW, and the charging of the battery 22 continues until both the battery temperature TBAT and the engine water temperature TW reach predetermined values. For this reason, by increasing the charging current supplied to battery 22, it is possible to generate Joule heat by means of the internal resistance of battery 22, and to provide for the self-heating of the battery 22.

Furthermore, even in a state in which a determination has been made that the remaining capacity SOC of the battery 22 is in an overcharged state, the charging of the battery 22 is continued until both the battery temperature TBAT and the engine water temperature TW reach predetermined values, and thereby, the internal resistance of the battery 22 is increased, and the generation of Joule heat is promoted.

Furthermore, when a determination is made that the remaining capacity SOC of the battery 22 is in a fully charged state, that is to say, that there is no more room to accept further charge, vibration damping control which controls motor M so as to cancel the periodic fluctuation in the drive force of engine E is conducted, and thereby, a load remains on engine E, and as a result of this load on engine E, the engine water temperature TW can be made to rise. By means of this, the temperature of the heater within the vehicle is caused to rise, and it is possible to indirectly heat the battery 22 via a fan or the like.

In this way, it is possible to cause an increase in the temperature of the battery 22 which is in allow temperature state, at an early stage, and by means of this increase in the temperature of battery 22, it is possible to increase, at an early stage, the acceptance width of the assistance amount and the regeneration power generation amount with respect to motor M.

In the embodiment described above, when the vibration damping control processing request flag F_CRSANV was set to "1" during cruising, a determination was made in step S501 as to whether the remaining capacity SOC of the battery was in excess of a predetermined upper limit value; however, this is not necessarily so limited, and a determination may be made as to whether predetermined changes in the voltage of battery 22 have been detected. In this case, even when the 12 volt auxiliary battery 23 is canceled and the accumulated value of the current is cleared, the changes in the voltage of battery 22 are measured, and thereby, it is possible to determine the state of battery 22, that is to say, whether battery 22 is in an essentially fully charged state, a state in which there is no room to accept further charge.

This invention may be embodied in other forms or carried out in other ways without departing from the spirit thereof. The present embodiment is therefore to be considered in all respects illustrative and not limiting, the scope of the invention being indicated by the appended claims, and all modifications falling within the meaning and range of equivalency are intended to be embraced therein.

What is claimed is:

1. A hybrid vehicle control system of a vehicle having an engine providing propulsion force to said vehicle; a motor assisting said engine in providing propulsion force of said vehicle in accordance with an operational state of said vehicle; and an electricity storage device storing energy generated when said motor is employed as a generator driven by said engine, and storing energy generated during a regenerative state of said motor when said vehicle decelerates, said hybrid vehicle control system comprising:

an electricity storage device temperature detector for detecting temperature of said electricity storage device;

an engine water temperature detector for detecting water temperature of said engine; and a power generation increasing device for increasing an amount of energy generated by said motor when said motor is used as a generator driven by said engine, either when said electricity storage device temperature is detected at or below a predetermined electricity storage device temperature by said electricity storage device temperature detector, or when said engine water temperature is detected at or below a predetermined temperature by said engine water temperature detector.

2. A hybrid vehicle control system in accordance with claim 1, further comprising:

a remaining capacity detector for detecting remaining capacity of said electricity storage device; and an overcharge correcting device for raising a power generation suppression threshold to suppress generation of electricity by said motor upon detecting said remaining capacity is in an overcharged state by said remaining capacity detector while the amount of energy generated by said motor is being increased by said power generation increasing device.

3. A hybrid vehicle control system in accordance with claim 2, further comprising:

a vibration suppressing controller for suppressing vibration of said engine resulting from fluctuations in the driving force of said engine, by using said motor as a generator when said driving force is increasing and by running said motor to assist said engine when said driving force is decreasing so as to cancel periodic amounts of fluctuation in the driving force of said engine, when said remaining capacity is detected by said remaining capacity detector to be in excess of a predetermined remaining capacity threshold value.

* * * * *